United States Patent
Bushey et al.

(10) Patent No.: US 6,389,400 B1
(45) Date of Patent: May 14, 2002

(54) SYSTEM AND METHODS FOR INTELLIGENT ROUTING OF CUSTOMER REQUESTS USING CUSTOMER AND AGENT MODELS

(75) Inventors: Robert R. Bushey; Thomas Deelman, both of Cedar Park; Jennifer Mitchell Mauney, Austin, all of TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 09/303,622

(22) Filed: May 3, 1999

Related U.S. Application Data
(60) Provisional application No. 60/097,174, filed on Aug. 20, 1998.

(51) Int. Cl.[7] .............................................. G06F 17/60
(52) U.S. Cl. .................................. 705/7; 705/8; 705/9
(58) Field of Search .................... 705/7, 8, 9; 379/265, 379/266, 220, 212

(56) References Cited

U.S. PATENT DOCUMENTS

| | | |
|---|---|---|
| 4,964,077 A | 10/1990 | Eisen et al. |
| 5,115,501 A | 5/1992 | Kerr |
| 5,204,968 A | 4/1993 | Parthasarathi |
| 5,206,903 A | 4/1993 | Kohler et al. |
| 5,263,167 A | 11/1993 | Conner, Jr. et al. |
| 5,299,260 A | 3/1994 | Shaio |
| 5,327,529 A | 7/1994 | Fults et al. |
| 5,335,269 A | 8/1994 | Steinlicht |
| 5,388,198 A | 2/1995 | Layman et al. |
| 5,420,975 A | 5/1995 | Blades et al. |
| 5,519,772 A | 5/1996 | Akman et al. |
| 5,535,321 A | 7/1996 | Massaro et al. |
| 5,537,470 A | 7/1996 | Lee |
| 5,561,711 A | 10/1996 | Muller |
| 5,594,791 A | 1/1997 | Szlam et al. |
| 5,600,781 A | 2/1997 | Root et al. |
| 5,657,383 A | 8/1997 | Gerber et al. |
| 5,684,870 A | * 11/1997 | Maloney et al. ............. 379/212 |
| 5,684,872 A | 11/1997 | Flockhart et al. |
| 5,710,884 A | 1/1998 | Dedrick |
| 5,825,869 A | * 10/1998 | Brooks et al. ............... 379/265 |

(List continued on next page.)

FOREIGN PATENT DOCUMENTS

WO    WO 200150336    * 7/2001   .......... G06F/17/27

OTHER PUBLICATIONS

Kelly, "From Intelligent Call Routing to Intelligent Contact Management," Call Center Solutions, v19, n3, Sep. 2000, 4 pages.*

"Call Center Roundup," Teleconnect, Dec. 1998, 10 pages.*

"Call centers: sales, service and competitive advantage," Canadian Business, v70, n2, Feb. 1997, 8 pages.*

Foster, "Advanced Definity call centers: Working for you and your customers," AT&T Technology, v9, n2, Summer 1994, 7 pages.*

Primary Examiner—Tariq R. Hafiz
Assistant Examiner—Marc Norman
(74) Attorney, Agent, or Firm—Greenblum & Bernstein, P.L.C.

(57) ABSTRACT

System and methods for intelligent routing of requests from customers to agents where a request is received at a service center from a customer. Identification information related to the customer is accessed. Background information on the customer is retrieved from a storage facility. Task and attitude information about the customer is gathered. A model of the customer is created. Models for at least two agents are created. A performance optimizing calculation is performed that matches the customer model and the models for the at least two agents. A best match agent from the at least two agents is determined based on the matching. The customer request is routed to the best match agent.

18 Claims, 12 Drawing Sheets

U.S. PATENT DOCUMENTS 5,903,641 A * 5/1999 Tonisson ................ 379/266
5,923,745 A * 7/1999 Hurd ..................... 379/220
5,953,406 A * 9/1999 LaRue et al. ............ 379/265
6,044,355 A * 3/2000 Crockett et al. .......... 705/8
6,134,530 A * 10/2000 Bunting et al. ........... 705/7
6,163,607 A * 12/2000 Bogart et al. ............ 379/266
6,173,053 B1 * 1/2001 Bogart et al. ............ 379/266

* cited by examiner $$M_{k,i} = 100 - \sum_{j=1,p} (W_j * |C_{k,j} - A_{i,j}|)$$

WHERE:
- M = MATCH SCORE (FROM 0 TO 100)
- W = ATTRIBUTE WEIGHTING VALUE (FROM 0.0 TO 1.0)
- C = CUSTOMER CALL ATTRIBUTE VALUE (FROM 0 TO 100)
- A = AGENT ATTRIBUTE VALUE (FROM 0 TO 100)

CUSTOMER  k = 1,m
AGENT     i = 1,n
ATTRIBUTE j = 1,p

FIG. 7

| ATTRIBUTE | DESCRIPTION | WEIGHT |
|---|---|---|
| 1 | CROSS SELLING ATTEMPTS | 0.5 |
| 2 | ANSWER QUESTIONS | 0.1 |
| 3 | COMPLETED CALLS (LESS THAN 6 MINUTES) | 0.4 |

FIG. 8

| ATTRIBUTE | AGENT 1 | AGENT 2 |
|---|---|---|
| 1 | 50 | 60 |
| 2 | 40 | 80 |
| 3 | 30 | 60 |

FIG. 9

| ATTRIBUTE | CUSTOMER 1 |
|---|---|
| 1 | 60 |
| 2 | 20 |
| 3 | 70 |

FIG. 10

| COLUMN 1 | | COLUMN 2 | | COLUMN 3 | | COLUMN 4 |
|---|---|---|---|---|---|---|
| 100 | − | {(.5 * \|60 − 50\|) | + | (.1 * \|20 − 40\|) | + | (.4 * \|70 − 30\|)} |
| 100 | − | {(.5 * (10)) | + | (.1 * (20)) | + | (.4 * (40))} |
| 100 | − | {( 5 ) | + | ( 2 ) | + | ( 16 )} |

| COLUMN 1 | | COLUMN 2 | | COLUMN 3 | | COLUMN 4 |
|---|---|---|---|---|---|---|
| 100 | − | {(.5 * \|60 − 60\|) | + | (.1 * \|20 − 80\|) | + | (.4 * \|70 − 60\|)} |
| 100 | − | {(.5 * (0)) | + | (.1 * (60)) | + | (.4 * (10))} |
| 100 | − | {( 0 ) | + | ( 6 ) | + | ( 4 )} |

| ATTRIBUTE | CUSTOMER 2 |
|---|---|
| 1 | 10 |
| 2 | 80 |
| 3 | 30 |

FIG. 13

| COLUMN 1 | | COLUMN 2 | | COLUMN 3 | | COLUMN 4 |
|---|---|---|---|---|---|---|
| 100 | − | {(.5 * \|10 − 50\|) | + | (.1 * \|80 − 40\|) | + | (.4 * \|30 − 30\|)} |
| 100 | − | {(.5 * (40)) | + | (.1 * (40)) | + | (.4 * (0))} |
| 100 | − | {( 20 ) | + | ( 4 ) | + | ( 0 )} |

| COLUMN 1 | | COLUMN 2 | | COLUMN 3 | | COLUMN 4 |
|---|---|---|---|---|---|---|
| 100 | − | {(.5 * \|10 − 60\|) | + | (.1 * \|80 − 80\|) | + | (.4 * \|30 − 60\|)} |
| 100 | − | {(.5 * (50)) | + | (.1 * (0)) | + | (.4 * (30))} |
| 100 | − | {( 25 ) | + | ( 0 ) | + | ( 12 )} |

SYSTEM AND METHODS FOR INTELLIGENT ROUTING OF CUSTOMER REQUESTS USING CUSTOMER AND AGENT MODELS

This application claims the benefit of U.S. Provisional Application No. 60/097,174 filed on Aug. 20, 1998, the contents of which is expressly incorporated by reference herein.

BACKGROUND OF THE INVENTION

1. Field of the Invention

This invention relates to routing requests from customers to agents, and more specifically to routing requests from a customer to an agent best matched for that customer based on a model of the customer and models of the agents.

2. Discussion of Background Information

A business or company that provides services and/or products to clients or customers may provide their customers with customer service in the form of a customer service center that handles customer requests. Customer requests may comprise requesting new products or services, getting support for a product or service, asking questions about a product or service, etc. If a customer made a call to the service center with a request, the service center would route the call to an agent or other capability that would service the customer's request.

The ideal incoming call center would route incoming calls so that each call is handled to the complete satisfaction of the customer, and also supports the business performance objectives of the center. The routing of incoming calls is accomplished with full and complete knowledge of the functionality, technology, and customer and agent requirements.

While functionality and technology issues are well represented in the management of a call center, a full rich understanding of the behavioral characteristics of the customer population, agent population, and the customer/agent interactions are not well understood. Presently, incoming calls are routed on a random "first come, first served" basis. The characteristics of both the customer and agent are simplistic by assuming a single view of both populations. This single view approach limits management's ability to influence the center's performance because not all of the customer's or agent's behaviors are accounted for during call routing. Thus the implemented routing system may function well for a certain set of customers or agents, while not being well matched to other sets within the population. When overall performance is critical, these mismatches and resulting reduced performances can cost organizations time and money.

The common practice in the industry is to route incoming calls to an available agent. There are two variations of this "available agent" routing in current practice. One variation is to route incoming calls to an available agent who has been idle, or not handling a call, for the longest period of time. The second variation is to route incoming calls to an available agent that is randomly chosen among agents of whom are available to take a call (no consideration for how long each individual agent has been idle). The current practice represents and treats the customer call population with a single set of characteristics and behaviors, i.e. any agent can take any customer call.

Some call centers may split off incoming customer calls to a dedicated agent group when the customer has a specific language preference. Some call centers also split off customer calls that originate from residences separate from customer calls that originate from businesses. In addition, some call centers split customer calls where the customer wishes to place an order for a service separate from the customer calls where the customer wishes additional information on their bill or similar information. For call centers that do separate incoming calls based on some criteria, the result of the actual call routing to an agent is still a randomly based transaction. Whether a call center performs any preliminary routing or not, currently, none of the call centers route customer calls to agents using a performance optimizing calculation.

Presently, if agents are categorized, they are done so on an informal basis based primarily on the opinion and judgment of the local operating management of the call center. Even though these agents may be identified by category, calls are not routed dependent upon those categories. Another aspect of current practice is that the description of behavior is done anecdotally, not statistically. Quantitative performance results are not incorporated into the behavioral descriptions. Customer and agent models are generally not constructed, primarily because there is only one agent representation and both management and agents accept that single view.

SUMMARY OF THE INVENTION

Accordingly, the present invention is directed to a method for intelligent optimized routing of requests from customers to agents based on behavioral models of the customers and the agents that substantially obviates one or more of the problems arising from the limitations and disadvantages of the related art.

It is an object of the present invention to provide a system and methods that use customer and agent models for matching a customer with an optimal agent.

It a further object of the present invention to provide a system and methods for routing requests from customers to optimal agents that increases customer satisfaction.

Another object of the present invention is to provide a system and methods for routing requests from customers to optimal agents that improves performance at a call center.

Accordingly, one aspect of the present invention is directed to a method for intelligent routing of requests from a customer to an agent that includes receiving a request from a customer, creating a behavioral model of the customer, creating behavioral models of at least two agents, matching the behavioral model of the customer with each of the behavioral models of the at least two agents, and routing the request from the customer to a best match agent of the at least two agents based on the matching.

According to another aspect of the present invention, the behavioral model of the customer is calculated from a detailed profile of the customer's needs, task objective, sales preferences, and expectations for satisfaction.

According to yet another aspect of the present invention, the behavioral model of the at least two agents is calculated from a detailed profile of the at least two agents' sales strategies, customer service behaviors, and sales performance.

In a further aspect of the present invention, the matching includes performance optimization calculations.

The present invention also includes obtaining identifying information from the customer where the identifying information may include the customer's telephone number, e-mail, or account number.

According to another aspect of the present invention, the identifying information is obtained by a human operator, an automatic caller ID system, an interactive voice response (IVR) interface, e-mail, Internet, or other communications channel.

According to yet another aspect of the present invention, the invention includes retrieving historical background information regarding the customer based on the identifying information.

In a further aspect of the present invention, the invention includes searching for historical background information regarding the customer's account based on the identifying information.

In the present invention, the customer's account information may include the customer's billing history, products and services currently being provided, or household information.

According to another aspect of the present invention, the invention includes obtaining information regarding the customer's current task objective and the customer's current expectations for satisfaction, the customer's current task objective and the customer's current expectations for satisfaction each including one or more attributes.

According to yet another aspect of the present invention, the customer's expectations for satisfaction attributes including the customer's willingness to be up-sold additional products or services, the customer's preference for a lengthy or brief negotiation, or the customer's desire to have questions answered.

According to a further aspect of the present invention, the invention includes upgrading the historical background information based on the customer's current task objective and the customer's current expectations for satisfaction.

According to another aspect of the present invention, the task objective attributes and the expectations for satisfaction attributes may be quantified and transformed into numerical values.

According to yet another aspect of the present invention, the invention includes calculating and constructing the customer model using the task objective attributes values and the customer expectations for satisfaction attributes values.

According to a further aspect of the present invention, the at least two agents' sales strategies, customer service behaviors, and sales performance each include one or more attributes.

According to another aspect of the present invention, the sales strategies attributes, customer service behaviors attributes, and sales performance attributes are quantified and transformed into numerical values.

According to yet another aspect of the present invention, the invention includes calculating and constructing the agent model using the sales strategies attributes values, customer service behaviors attributes values, and sales performance attributes values.

According to a further aspect of the present invention, each task objective attribute and each customer expectations for satisfaction attribute are assigned a weighting value based on a relative importance of the each attribute.

According to another aspect of the present invention, each sales strategies attribute, customer service behavior attribute, and sales performance attribute is assigned a weighting value based on a relative importance of each attribute.

According to yet another aspect of the present invention, the weighting value for each attribute is used in the calculating and constructing of the customer model.

According to a further aspect of the present invention, the weighting value for each attribute is used in the calculating and constructing of the agent model.

According to another aspect of the present invention, the performance optimizing calculations are used to generate a match score for each of the at least two agents.

According to yet another aspect of the present invention, the best match agent is the agent with the highest match score.

According to a further aspect of the present invention, a list of optimal agents is generated based on the match scores of the at least two agents that are above an optimal threshold.

According to another aspect of the present invention, the request from the customer is routed to an available agent on the list of optimal agents.

According to yet another aspect of the present invention, the request from the customer is placed in a wait queue until an agent on the list of optimal agents becomes available.

According to a further aspect of the present invention, additional agents are added to the list of optimal agents the longer the request from the customer remains in the wait queue. The additional agents are added after reducing the optimal threshold. A wait time is increased while the request from the customer is in the wait queue.

According to another aspect of the present invention, the request from the customer is routed to an available agent with the highest match score when the wait time equals a maximum wait time.

According to yet another aspect of the present invention, the optimal threshold and the maximum wait time are set by a call center controller.

According to a further aspect of the present invention, the invention includes a method for intelligent routing of requests from customers to agents that includes: receiving a request from a customer, accessing identification information related to the customer, retrieving background information on the customer, gathering task and attitude information about the customer, calculating a model of the customer, retrieving models for at least two agents, performing performance optimizing calculations using the customer model and the models for the at least two agents, identifying an optimal agent from the at least two agents based on said performing, and routing the request to the identified optimal agent.

According to another aspect of the present invention, the invention includes an intelligent routing system for intelligent routing of requests from customers to agents using models of the customers and models of the agents that includes a first interface where the first interface receives requests and information from at least one customer. The first interface communicates customer data gathering information to the at least one customer from the intelligent call routing system. A second interface receives agent availability information from at least two agents. The agent interface communicates agent data gathering information to the at least two agents from the intelligent call routing system. A database contains behavior models of the at least one customer and behavioral models of the at least two agents. A first processor is operatively connected to the first interface and the database where the first processor generates customer models based on the customer data gathering from every at least one customer and stores the customer models in the database. The first processor gathers customer identification, customer task, and customer attribute information from the at least one customer. The first processor retrieves one of the customer models from the database based on the customer identification, the customer task, and the customer attribute information. A second processor is operatively connected to the second interface and the database where the second processor generates an agent model based on the agent data gathering from every at least two agents and stores the agent models in the database. The second processor gathers agent identification and agent attribute information from the at least two agents, and retrieves the agent models from the database. A third processor is operatively connected to the first processor and the second processor where the third processor compares the one of the customer models with every agent models associated with each at least two agents and calculates a match score for each at least two agents. The third processor generates and stores a list containing best matching agents where the best matching agents include all the at least two agents with a match score at or above a threshold value. A timer is operatively connected to the first interface where the timer tracks the length of time from receipt of the customer request. A fourth processor is operatively connected to the third processor, the first interface, the second interface, and the timer. The fourth processor monitors the availability of each best matching agents. The fourth processor routes the customer request to the first available best matching agent.

According to yet another aspect of the present invention, the fourth processor uses a match graph associated with the customer, the match graph is generated by the first processor based on the customer model and parameters from a service center, the match graph defining times during the length of time from receipt of the customer request and associated lower threshold values when additional best matching agents may be added to the list based on the lower threshold values.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein:

FIG. 7 is an exemplary performance optimization calculation according to the present invention;

FIG. 8 is a table of exemplary attributes and weights according to the present invention;

FIG. 9 is a table of exemplary attribute scores for two agents according to the present invention;

FIG. 10 is a table of exemplary attribute scores for an exemplary Customer 1 according to the present invention;

FIG. 11 is a table showing exemplary Agent 1 and Customer 1 match calculation according to the present invention;

FIG. 12 is a table showing exemplary Agent 2 and Customer 1 match calculation according to the present invention;

FIG. 13 is a table of exemplary attribute scores for an exemplary Customer 2 according to the present invention;

FIG. 14 is a table showing an exemplary Agent 1 and Customer 2 match calculation according to the present invention;

FIG. 15 is a table showing an exemplary Agent 2 and Customer 2 match calculation according to the present invention;

DETAILED DESCRIPTION OF THE PRESENT INVENTION

Figure 1:
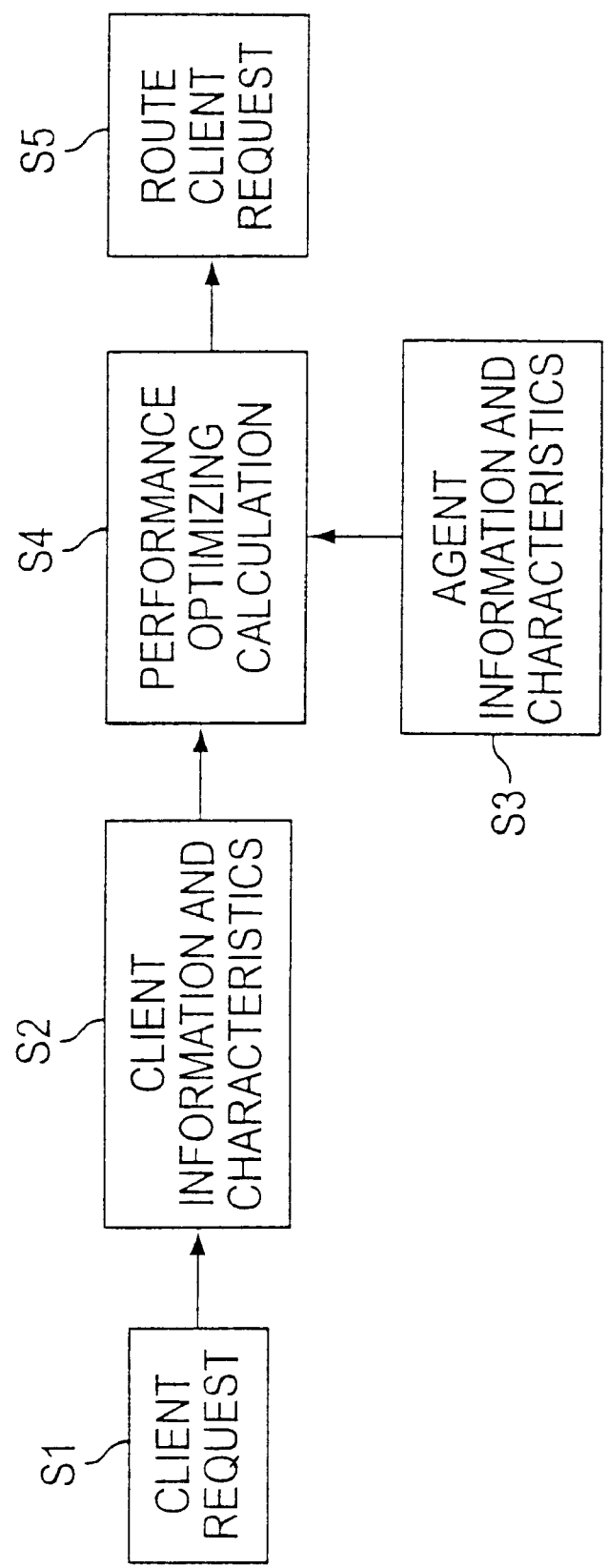
FIG. 1 is a flow chart of an exemplary method for intelligent call routing according to the present invention.

The particulars shown herein are by way of example and for purposes of illustrative discussion of the embodiments of the present invention only and are presented in the cause of providing a useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The present invention integrates customer and agent models into a single perspective. A customer desires to accomplish a particular task, e.g., requesting information about a particular product or service, ordering a product or service, or requesting additional information concerning a bill. The customer contacts the company or organization through some channel or technique, e.g., a telephone call, Internet, computer network, or in person. The organization gathers information regarding the customer. Using this information, the customer is grouped into categories and assigned a set of customer characteristics. The customer's characteristics are compared to similar characteristics of the agents. A matching process is performed to determine the agent with characteristics that best matches the customer's characteristics. If the best agent match is unavailable (e.g. busy servicing another customer), the customer's request is placed on "hold status" and will wait until an agent with a match above a certain threshold is available, or until a customer wait time reaches an upper limit of acceptability.

The present invention may utilize a method for the construction of behavioral models of customers, and others, described in commonly-assigned co-pending patent application Ser. No. 09/089,403, filed Jun. 3, 1998, to R. Bushey et al., the subject matter of which is expressly incorporated by reference herein in its entirety.

The present invention may use the method of patent application Ser. No. 09/089,403 to assist in construction of customer and agent models. Specifically, both the customers and agents are first categorized into a small number of groups. These categorizations are based upon characteristics that are important to customer satisfaction and system operation performance. Characteristics for agents may include sales performance measures, cognitive workload measures, computer interface navigation preferences, sales strategies, and additional behaviors related to when agents discuss or negotiate the sale or use of additional services with customers (i.e., up-selling additional services). Agents that show similar patterns and preferences are then categorized into distinctive groups. Therefore, members of each group share similar profiles. Once the groupings or profiles are established, a subset of members from each group is selected and additional characteristics are observed and described during actual sales negotiations. The characteristics are examined for similarities within the group and differences between the groups. The additional data captured during this phase serves to validate the groupings, and revise them if necessary. The emphasis of these descriptions focuses on characteristics that affect process and system operation. Once the groupings are validated, qualitative and quantitative agent models are constructed for each group.

Similarly, the above method may be applied to the construction of customer models. Characteristics for customers may include cognitive workload measures, task needs, sales preferences, expectations for satisfaction, and other appropriate measures. The customers are grouped based upon these characteristics, and then some of the members from each of the groups are selected and their characteristics observed and documented. The groupings are once again validated and refined if needed through this process. Once the customers' characteristics are well understood within a given group, a customer model is constructed for that group.

Both customer and agent models include information regarding how members within a specific group will behave in certain situations or perform certain functions. The models also incorporate the capability to make numerical performance predictions for customers and agents in these situations or performing these functions. These models are developed to the degree of detail necessary to adequately represent the groups for the purposes of intelligent customer request routing. Customer and agent models may be generated periodically, e.g. once a year or every two years, etc., or as often as needed. They are generated as described previously, using a sampling of customers and agents. Customers and agents are monitored for a period of time to identify characteristics that will be used for generation of the models. Once the models are generated, all agents are associated with an agent model based on the behavioral characteristics of each individual agent. Similarly, when a customer makes a request, prior behavioral history of that customer, along with current information obtained from the customer, is used to associate a customer model with the particular customer.

The present invention will be explained using an embodiment of a service center that receives requests from customers in the form of telephone calls and routes the call to a best matched agent based on a performance optimization method. The present invention will be further explained using a performance optimization method in the form of a mathematical performance optimization calculation, however, the present invention is not limited to this method of performance optimization. Further, the present invention is not limited to customer requests, customers being serviced by agents, or service centers handling requests, but may be applied to any system or method that uses behavior models and a performance optimization process to increase the satisfaction with a communication between two or more parties.

FIG. 1 is an exemplary flow chart that illustrates how the present invention improves the routing of incoming customer requests by integrating customer and agent models and subsequently matching a given customer's profile to an appropriate agent profile. Initially, the client makes a request (S1) of a service, product, or the answer to a question. Upon receipt of the request, client information and characteristics are gathered (S2). Prior to or concurrently with the gathering of client information and characteristics, agent information and characteristics are gathered (S3). The client information and agent information are supplied to a performance optimizing calculation (S4) that calculates the best matching agent to service the customer based on the client and agent information. The client's request is then routed to the best matching available agent (S5).

The flow chart depicted in FIG. 1 will be further described by examining its components. The following description tracks how a customer's call to a service center is routed to the best matching agent.

Figure 2:
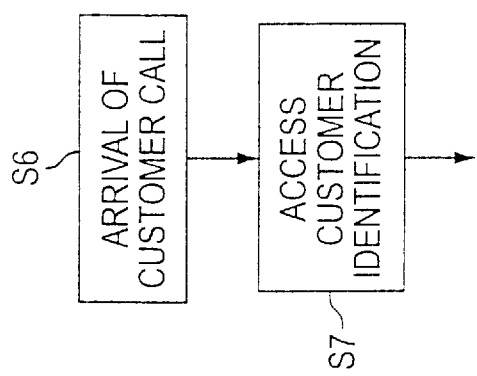
FIG. 2 is a flow chart of initial customer inquiry and identification according to the present invention.

FIG. 2 shows the preliminary steps involved in a client or customer's initial inquiry to a customer service center. In this exemplary example, the customer's initial inquiry is in the form of a phone call. Once the customer's call is placed to the call center (S6), the customer's identification is accessed (S7). A customer's identification may take the form of a name, telephone number, E-mail address, account number, etc. Accessing customer identification may be implemented through an automatic caller ID system, an Interactive Voice Response (IVR) prompt question, computer, human operator, or any other method that may obtain customer identification information.

Figure 3:
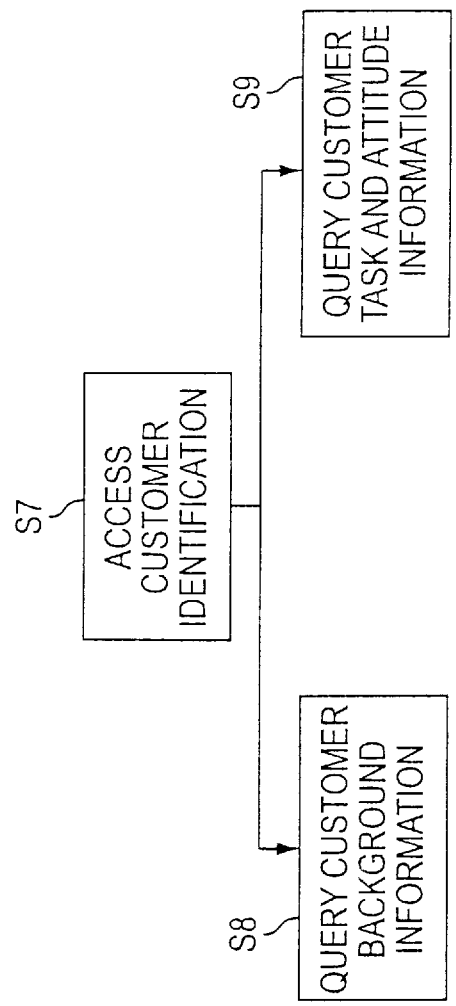
FIG. 3 is a flow chart of the query of additional customer information according to the present invention.

FIG. 3 shows that once the customer's identification is obtained (S7), additional information is accessed and acquired. Customer identification information may be used to search archived historical background information (S8) regarding the customer and his/her corresponding account information. Account information may include information regarding billing history, products and services currently being provided, household information, etc.

While the customer background information is being queried (S8), the customer may be routed to a survey to identify the current task they are trying to complete and to identify their current attitude as it relates to customer satisfaction issues (S9). Customer satisfaction issues may include assessing aspects such as the customer's willingness to be up-sold additional products and services, whether they prefer a lengthy or brief negotiation, and whether they have questions in mind that they wish to have answered. This customer survey may be administered in the form of an IVR, a human operator, a questionnaire on the Internet, or some other form.

Figure 4:
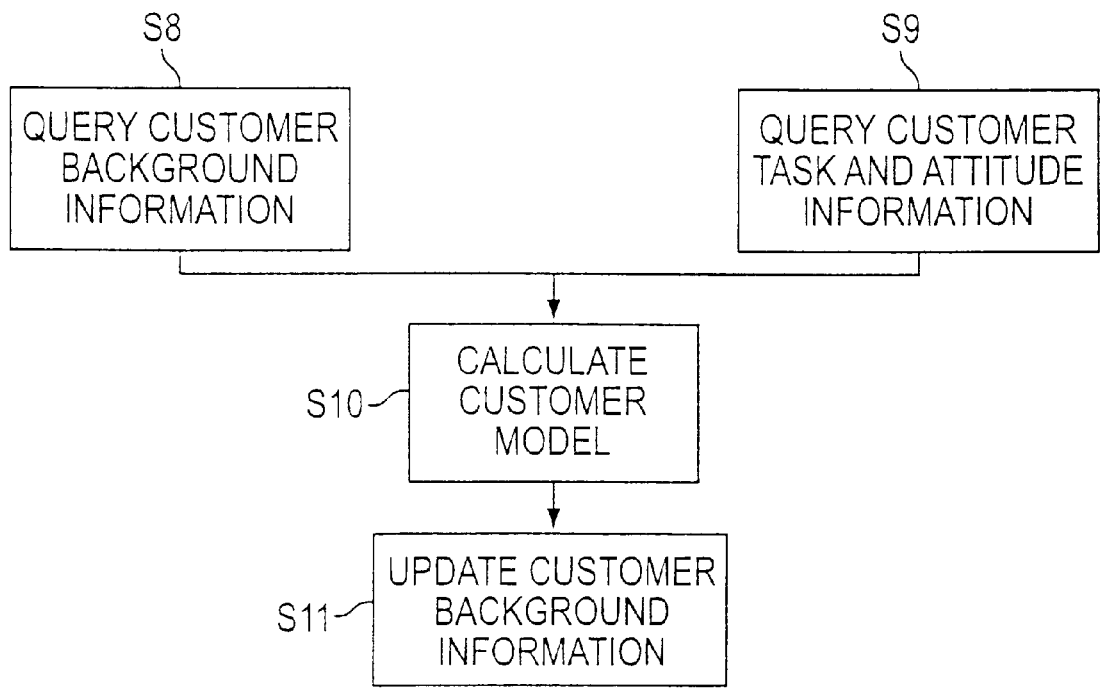
FIG. 4 is a flow chart of customer model calculation and information update according to the present invention.

FIG. 4 shows that the customer's background information is combined with the information concerning the customer's current task and attitude in order to construct and calculate the customer model (S10). Information obtained through the customer task and attitude query along with the customer's background information may be quantified and transformed into a score of 0–100. For example, if a customer indicates a strong preference to hear about new products and services, the customer may receive a score of 90 on the particular attribute that relates to a willingness to be up-sold additional products and services. Scores would be calculated for each customer attribute. Once the customer model is calculated, information from this model is used to update the customer's background information for future access (S11).

Figure 5:
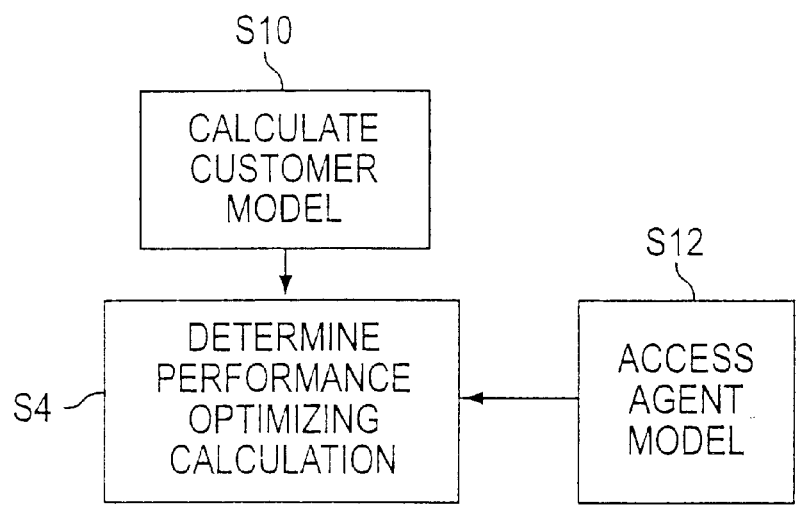
FIG. 5 is a flow chart of inputs and computation of the performance optimization calculation according to the present invention.

Models for each agent are prepared based on each agent's information and characteristics. These models may be created after the customer's request is received, or created in advance, stored, and accessed when needed. Each agent model is accessed (S12) and compared with the customer's model. This comparison may be performed using a performance optimizing calculation (S4) as shown in FIG. 5. This performance optimizing calculation matches the incoming customer's call with an ideal agent. This match best supports performance goals defined by the customer service center. Each performance goal category (e.g. revenue, expense, etc.) is considered sequentially. Within each performance goal category, each agent is evaluated as to how well their particular characteristics match with the characteristics of the customer who placed the incoming call. An agent is assigned an overall customer call match score by combining each of the performance goal category scores. This agent evaluation may be defined on a scale from 0 to 100, where 100 represents an ideal match. For each incoming customer call, each agent has an overall match score indicating how well that particular agent is suited to handle that particular customer call.

Figure 6:
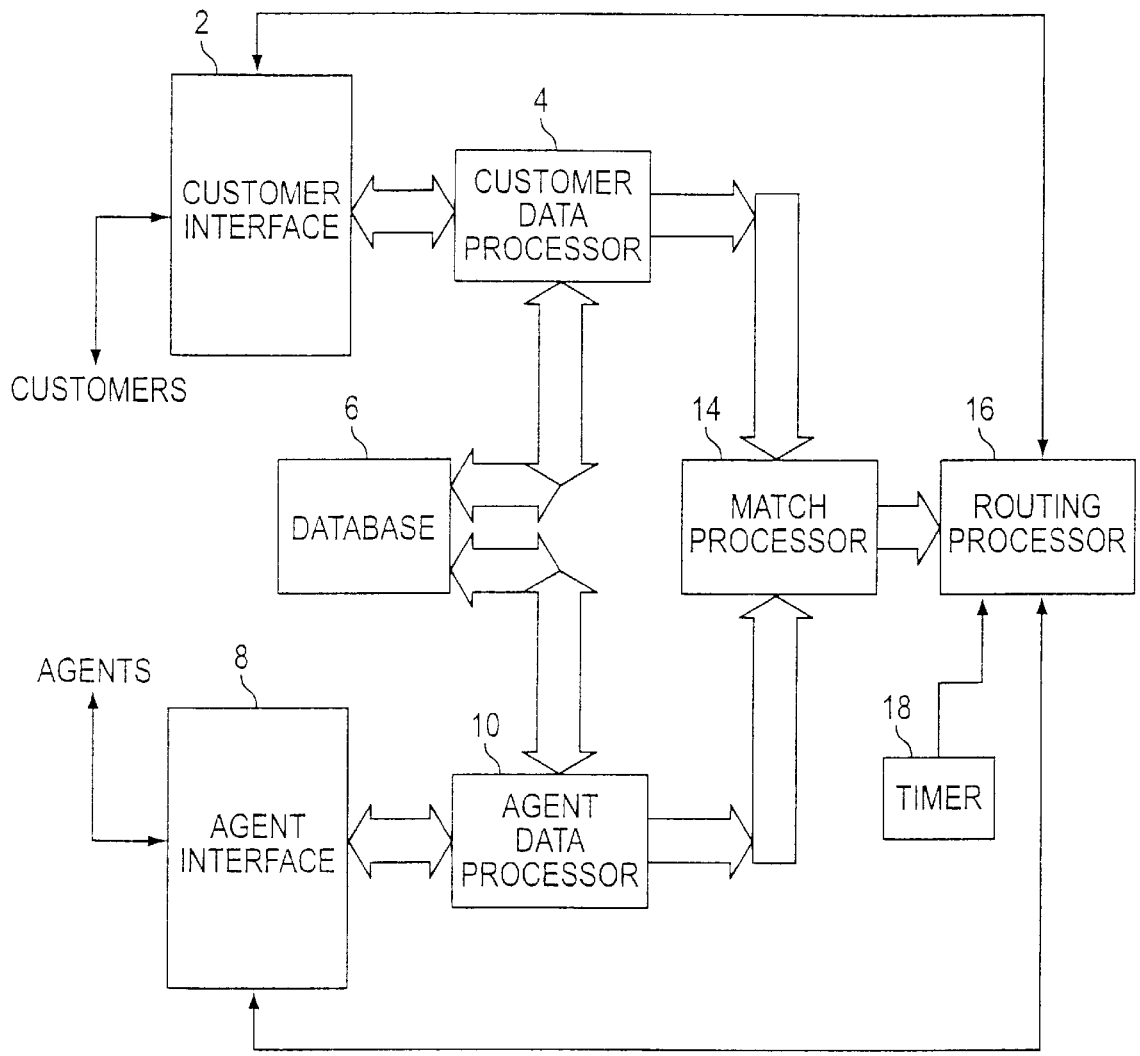
FIG. 6 is a block diagram of an exemplary intelligent routing system according to the present invention.

FIG. 6 shows a functional block diagram of an exemplary intelligent routing system according to the present invention. Customers contact a service center 1 that handles requests from customers. Customers contact the service center through a customer interface 2. This interface may be any of a variety of devices or methods that allow communication between a customer and the service center, for example, a telephone, IVR (Interactive Voice Response) system, Internet, computer, or any other device or combination of devices. The customer interface 2 allows two-way communication between customers and the service center. Therefore, customers can make requests to the service center, and the service center can solicit information from customers.

Once contact has been established between a customer and the service center through the customer interface 2, the customer's request is sent to a customer data processor 4. The customer data processor 4 may then poll the customer to obtain additional information regarding the customer's identity, request, or attitude. Information regarding the customer's identity is provided to a database 6 where it is used to search archived historical background information regarding the customer and his/her corresponding account information. The background and account information, along with the customer request and attitude information, are used by customer data processor 4 to identify a customer model associated with this particular customer. Customer data processor 4 also generates customer models based on data from many customers as discussed previously. Once a customer model is identified for the customer making the request, the customer model is retrieved from database 6 by customer data processor 4.

An agent interface 8 allows communication between the agents and the service center. The agents may reside at the service center, or be connected from a remote location through the agent interface. Agent interface 8 is similar to customer interface 2. Information regarding the agents is gathered by agent data processor 10 through agent interface 8. This information relates to identification and attribute data about each agent. The agent attribute information is used by agent data processor 10 to identify an agent model associated with a particular agent. Agent data processor 10 also uses information from all agents to create the agent models. Once a customer makes a request at the service center, agent processor 10 retrieves all agent models from database 6.

A match processor 14 compares the customer model, representing aspects of the customer making the request, with all the agent models. Match processor 14 receives the customer model from customer data processor 4 and the agent models from agent data processor 10. The customer model is matched and compared with each agent model, and a match score is generated for each agent based on the agent model associated with the agent. The match score reflects how good a match a particular agent is for servicing the customer making the request.

Routing processor 16 processes the routing of the customer's request to an agent. The routing processor 16 receives the match scores of all the agents from match processor 14. The service center determines a threshold match value that agents must achieve regarding the requesting customer. Routing processor 16 generates a list of best matched agents that obtain match scores equal to or above the threshold level based on the comparisons of the customer model with the agent models. The threshold values are set by the service center based on the performance goals of the service center.

Initially, the customer request may be routed only to an available agent on the list that has a score equal to or greater than this threshold match value. If the threshold is lowered while the customer request is still pending, additional agents may be added to the list and allowed to service this customer. If the customer has been waiting for too long a time without having been serviced, the list and agent match values may be ignored, and the customer's request may be routed to any next available agent.

A timer 18 tracks how long the customer has been waiting after making a request. A call wait graph may be generated that maps the threshold match level against the time elapsed since the customer made the request. This call wait graph is based on the customer model and the performance goals of the service center, and may contain one or multiple threshold levels that vary with the elapsed time. Routing processor 16 may use the timer information and the call wait graph to create the list of best matched agents, modify the list, and route the request. Routing processor 16 monitors the availability of the agents, and routes the customer request to the first available agent on the list. If a certain elapsed time has been reached based on the call wait graph, routing processor 16 routes the customer request to the next available agent.

The customer background information, customer models, and agent models may reside in separate databases and still be within the spirit and scope of the present invention. Further, it is not necessary that the customer interface be separate from the customer data processor, but these two functions may be integrated together, as well as the agent interface and agent data processor being integrated together, and both configurations still be within the spirit and scope of the intelligent request routing system according to the present invention. Moreover, a configuration that has all or some of the various processors, 4, 10, 14 and 16, integrated into one or more units also is within the spirit and scope of the present invention.

FIG. 7 shows an exemplary performance optimizing calculation according to the present invention. M represents the match score of a particular agent (subscript i) to a particular calling customer (subscript k). For each attribute (subscript j), the absolute value of the agent attribute value subtracted from the customer call attribute value is multiplied by a weighting value associated with that particular attribute. This is performed for all attributes, and then the sum of the resulting values is subtracted from 100 to get the agent match score M. This calculation is performed for all customers k=1 to m, all agents i=1 to n, and all attributes j=1 to p, where m, n and p are the maximum number of customers, agents, and attributes respectively.

The performance optimization will be further explained using two examples. In the first example, three attributes will be used in the matching of two agents and one customer. These attributes and their respective weights are presented in FIG. 8. Attribute 1 is cross-selling attempts, which is weighted at 0.5. Cross-selling attempts are the ability of the agent to attempt to sell additional services to the customer. Attribute 2 is the ability of the agent to satisfactorily answer the customer's questions. This may be judged based on surveys taken of customers, serviced by the particular agent, after a period of time (e.g. days or weeks) since the customer's request. This attribute has a weight of 0.1 and is, therefore, viewed as one-fifth as important as the cross-selling attempts attribute. The third attribute is the ability of the agent to quickly complete the call. The goal set by the service center in this example is to complete the call within six minutes. This attribute has a weight of 0.4. In the preferred embodiment of the present invention, the sum of all of the attributes' weights equals 1.0.

The two agents may have a score from 0 to 100 pertaining to each attribute used in the calculation. These attribute scores are part of the agents' models, and may be developed from the method for the construction of behavioral models described in patent application Ser. No. 09/089,403 mentioned previously, or from any other method that generates behavioral models.

FIG. 9 shows each agent's scores for each of the three attributes. In this example, Agent 1 has a score of 50 and Agent 2 has a score of 60 for attribute 1 (cross-selling attempts). Thus, Agent 2 attempts to make more additional sales since Agent 2's score is greater than Agent 1's score. For attribute 2, satisfactorily answers questions, Agent 1 has a score of 40 and Agent 2 has a score of 80. Therefore, Agent 2 typically answers questions to a greater degree of customer satisfaction than Agent 1. For the final attribute, completes calls quickly, Agent 1 has a score of 30 and Agent 2 has a score of 60. Therefore, Agent 2 completes calls quicker than Agent 1.

FIG. 10 shows exemplary scores for Customer 1 for each of the three attributes. These scores are developed from the customer's background information and/or the customer's responses to a task and attitudinal query. In this example, Customer 1 has a score of 60 for attribute 1, cross-selling attempts. This implies that this customer does not mind being sold some additional services, but does not want the agent to continually try to sell additional services. For attribute 2, Customer 1 has a score of 20. This implies that this customer does not usually ask questions. For attribute 3, Customer 1 has a score of 70. This suggests that the customer prefers the duration of the call to be rather quick.

FIG. 11 shows the match calculations for Agent 1. After attribute scores for each attribute are generated for the agents and customer, the match score may be calculated for each agent. For clarity, the calculations will be explained by each column (1–4). In column 2, the weight (0.5) of attribute 1 (cross-selling attempts) is multiplied by the absolute difference of Customer 1's score for attribute 1 (60) and Agent 1's score for attribute 1 (50). The absolute difference is calculated first. The absolute difference 10 is then multiplied by the weight (0.5) of attribute 1, which equals 5.

The same calculations performed for attribute 1 are performed for attributes 2 and 3 in columns 3 and 4 respectively. In column 3, the weight (0.1) of attribute 2 (answer of questions) is multiplied by the absolute difference of Customer 1's score for attribute 2 (20) and Agent 1's score for attribute 2 (40). The absolute difference is 20. This difference is then multiplied by the weight (0.1) of attribute 2, which equals 2.

In column 4, the weight (0.4) of attribute 3 (completed calls) is multiplied by the absolute difference of Customer 1's score for attribute 3 (70) and Agent 1's score for attribute 3 (30). The absolute difference is 40. This difference is then multiplied by the weight (0.4) of attribute 3, which equals 16. Each of the scores in columns 2, 3, and 4 (5, 2 and 16 for attributes 1, 2 and 3 respectively) are added together and then subtracted from column 1 (100). Thus, the match score for Agent 1 and Customer 1 is 77. On a 100-point scale, a match of 77 may be considered good.

FIG. 12 shows exemplary calculations for Agent 2 and Customer 1. In column 2, the weight (0.5) of attribute 1 (cross-selling attempts) is multiplied by the absolute difference of Customer 1's score for attribute 1 (60) and Agent 2's score for attribute 1 (60). The absolute difference, calculated first, is 0. This difference is then multiplied by the weight (0.5) of attribute 1, which equals 0.

The calculations for attributes 2 and 3 are shown in columns 3 and 4 respectively. In column 3, the weight (0.1) of attribute 2 (answer questions) is multiplied by the absolute difference in Customer 1's score for attribute 2 (20) and Agent 2's score for attribute 2 (80). The absolute difference is 60. This difference is then multiplied by the weight (0.1) of attribute 2, which equals 6.

In column 4, the weight (0.4) of attribute 3 (completed calls) is multiplied by the absolute difference of Customer 1's score for attribute 3 (70) and Agent 2's score for attribute 3 (60). The absolute difference is 10. This difference is then multiplied by the weight (0.4) of attribute 3, which equals 4.

Each of the attribute scores in columns 2, 3, and 4 (0, 6 and 4 for attributes 1, 2 and 3 respectively) are added together and then subtracted from column 1 (100). Thus, the match score for Agent 2 and Customer 1 is 90. On a 100-point scale, a match of 90 is very good.

The agent with the match score closest to 100 is the agent best suited for that customer. In this example, Agent 2, with a score of 90, would be a better match for Customer 1 than Agent 1, with a score of 77.

In a second example, the same two agents, Agent 1 and Agent 2, are matched to a different customer, Customer 2. The attributes have the same weights as before, and the agents have the same attribute scores. However, Customer 2 is a new customer and has the attribute scores shown in FIG. 13.

Customer 2 has a score of 10 for attribute 1, cross-selling attempts. Thus, this customer does not want the agent to attempt to sell additional services to her. For attribute 2, Customer 2 has a score of 80. Therefore, this customer prefers that questions be answered in a very detailed and specific manner. For attribute 3, Customer 2 has a score of 30. This suggest that this customer prefers the call to take as long as needed to complete the request, but it should not be exceedingly long.

FIG. 14 shows exemplary match calculations for Agent 1 and Customer 2. In column 2, the weight (0.5) of attribute 1 (cross-selling attempts) is multiplied by the absolute difference of Customer 2's score for attribute 1 (10) and Agent 1's score for attribute 1 (50). The absolute difference, calculated first, is 40. The absolute difference is then multiplied by the weight (0.5) of attribute 1, which equals 20.

In column 3, the weight (0.1) of attribute 2 (answer questions) is multiplied by the absolute difference of Customer 2's score for attribute 2 (80) and Agent 1's score for attribute 2 (40). The absolute difference is 40. This difference is then multiplied by the weight (0.1) of attribute 2, which equals 4.

In column 4, the weight (0.4) of attribute 3 (completed calls) is multiplied by the absolute difference of Customer 2's score for attribute 3 (30) and Agent 1's score for attribute 3 (30). The absolute difference is 0. This difference is then multiplied by the weight (0.4) of attribute 3, which equals 0.

The scores in columns 2, 3, and 4 (20, 4 and 0 for attributes 1, 2 and 3 respectively) are added together and then subtracted from column 1 (100). Thus, the match score for Agent 1 and Customer 2 is 76. On a 100-point scale, a match of 76 is good.

FIG. 15 shows the match calculations for Agent 2 and Customer 2. In column 2, the weight (0.5) of attribute 1 (cross-selling attempts) is multiplied by the absolute difference of Customer 2's score for attribute 1 (10) and Agent 2's score for attribute 1 (60). The absolute difference, 50, is then multiplied by the weight (0.5) of attribute 1, which equals 25.

In column 3, the weight (0.1) of attribute 2 (answer questions) is multiplied by the absolute difference of Customer 2's score for attribute 2 (80) and Agent 2's score for attribute 2 (80). The absolute difference 0 is then multiplied by the weight (0.1) of attribute 2, which equals 0.

In column 4, the weight (0.4) of attribute 3 (completed calls) is multiplied by the absolute difference of Customer 2's score for attribute 3 (30) and Agent 2's score for attribute 3 (60). The absolute difference 30 is then multiplied by the weight (0.4) of attribute 3, which equals 12.

Each of the attributes scores in columns 2, 3, and 4 (25, 0 and 12) are added together and then subtracted from column 1 (100). Thus, the match score for Agent 2 and Customer 2 is 63. On a 100-point scale, a match of 63 may be considered average.

The agent with the match score closest to 100 is the agent best suited for that customer. For this example, Agent 1, with a match score of 76, would be a better match for Customer 2 than Agent 2, who has a match score of 63.

Figure 16:
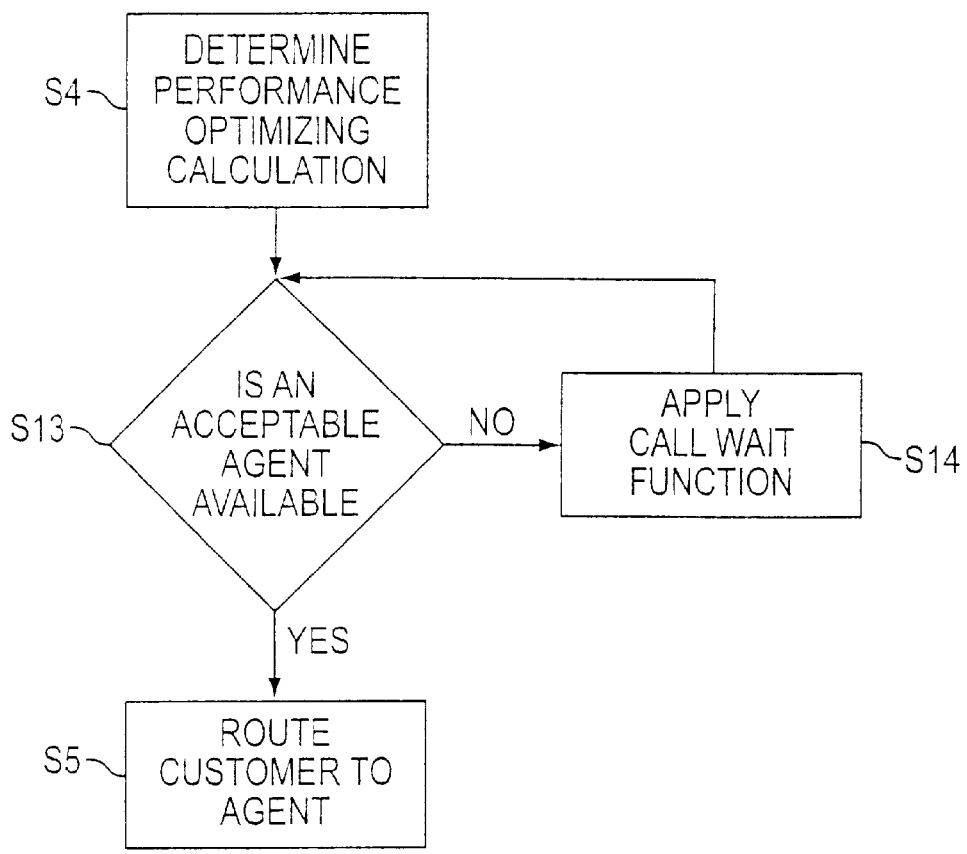
FIG. 16 is a flow chart of an exemplary acceptable agent availability question and results according to the present invention.

For each customer that makes a request, a match score is calculated for each agent. Based on the match scores of the agents, and an optimal score threshold level that defines the cutoff for which agents are included or not included on the list, a list of optimal agents is generated. As shown in FIG. 16, if one or more of these optimal agents are available to accept a call (S13), the customer's call will be routed to the best matching agent (S5). If none of these optimal agents is available, a Call Wait Function is initiated (S14). The customer's call may remain in the "wait" queue until one of the optimal agents becomes available. The longer a particular customer's call remains in the "wait" queue, additional agents are added to the optimal agents list. This may be accomplished by reducing the optimal threshold level as the customer's wait increases.

This dynamic threshold feature for the optimal agents list is an advantageous capability for managing customer satisfaction at the service center. Customer satisfaction decreases as call wait time increases. This dynamic threshold feature according to the present invention allows for customers who have waited for longer times to have greater flexibility in being assigned an agent to take their call.

Customer wait time is based on the level of match between the customer and agent, the agent availability, and the amount of time the customer has been waiting. Factors that are considered at the service center include: (a) customer wait time (longer the wait time, the greater dissatisfaction), (b) the match score (the better the match, the better achievement of goals), and (c) the avoidance of the customer abandoning their call (abandoned call has potentially lost sales and greater dissatisfaction).

The ideal solution is where the customer's request can be routed to an agent with an acceptable match score with no waiting. The threshold for the "acceptable match score" is defined by call center management.

Figure 17:
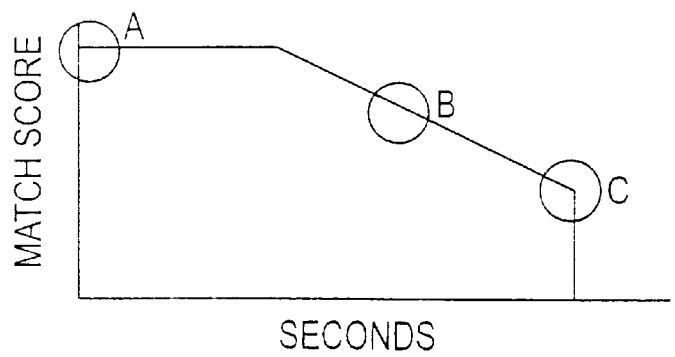
FIG. 17 is a graph of an exemplary call wait function according to the present invention.

FIG. 17 is an example of a graph depicting a Call Wait Function according to the present invention. The point where the line intersects the Y axis (shown as A) defines the threshold for the "acceptable match score". The slope of the line between the Y axis and where the line elbows down to the X axis (shown as B) defines the magnitude of the increasing customer dissatisfaction as wait time increases. The elbow (shown as C) defines the point where the customer is about to abandon their call, and where their call is routed to an available agent with the highest match score.

Figure 18:
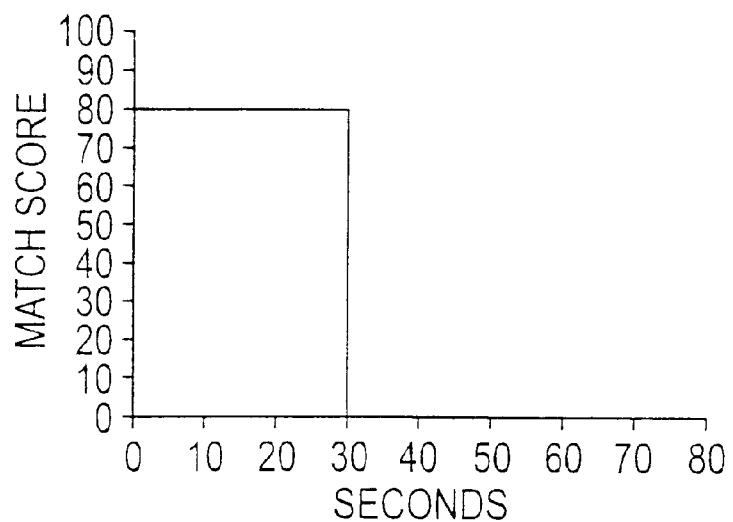
FIG. 18 is a graph of an exemplary call wait function with an acceptable match score of 80 and a maximum 30 second wait according to the present invention.

FIG. 18 shows that in its simplest form, the Call Wait Function has no slope. Call center management may decide that it desires a high degree of match, thinks that the customer does not mind waiting up to 30 seconds, and that the customer will abandon their call after 30 seconds of waiting. In this example, the optimal agent to accept the call may be one who has an acceptable match score of 80 or greater. The customer's request would be routed only to an available agent with a score of 80 or greater. If after 30 seconds there is still no available agent with a score of 80 or greater, the call would be routed to the highest scoring, available agent. This ensures that the call is handled before the customer abandons the call.

Figure 19:
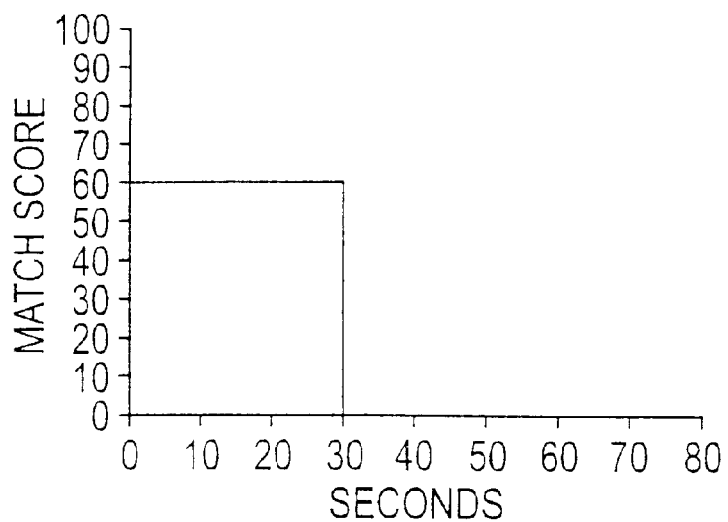
FIG. 19 is a graph of an exemplary call wait function with an acceptable match score of 60 and a maximum 30 second wait according to the present invention.

Call center management determines the level or value of the acceptable match score. Therefore, the score of 80 used previously is only exemplary. The acceptable match score may be either higher or lower depending on the level set by call center management. FIG. 19 shows a graph where the acceptable match score is 60 or above.

Figure 20:
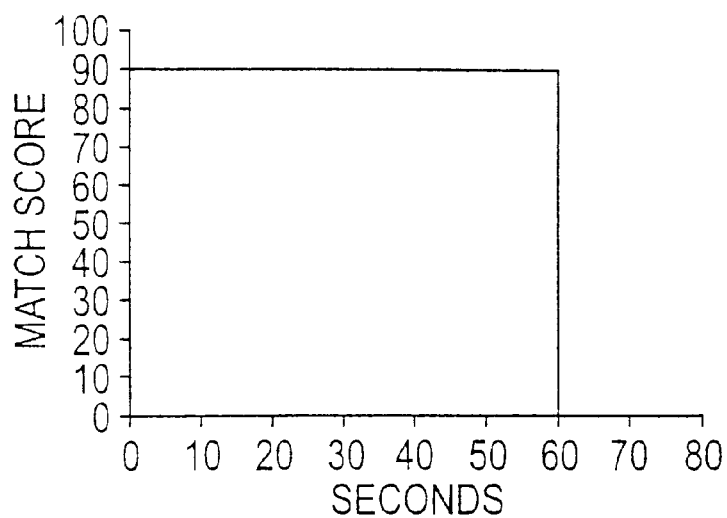
FIG. 20 is a graph of an exemplary call wait function with an acceptable match score of 90 and a maximum 60 second wait according to the present invention.

Call center management also determines the length of time at which a customer may be willing to wait for an agent before getting annoyed and possibly abandoning the call. This length of time may be a short duration or a long duration. FIG. 20 shows a graph where the expected amount of time a customer will wait for an agent is 60 seconds or less. Note that call center management determined the acceptable match score to be at 90 or greater.

Figure 21:
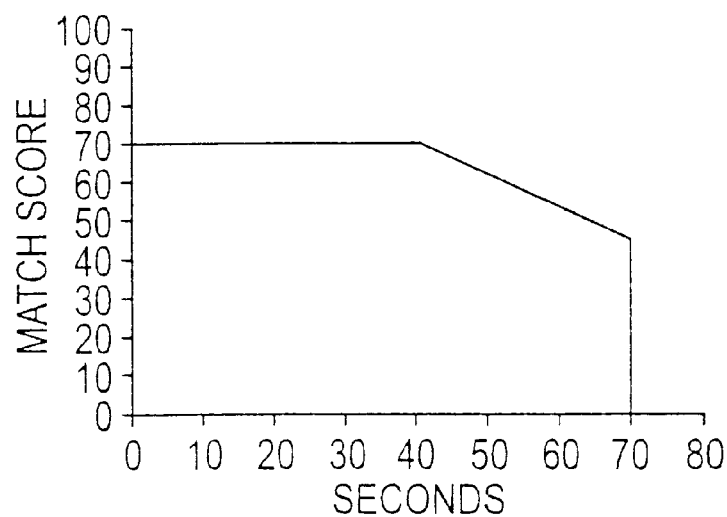
FIG. 21 is a graph of an exemplary call wait function with an acceptable match score of 70 and a maximum 40 second wait, then a decreasing match score up to a 70 second wait according to the present invention.

Call center management may interpret the time at which a customer is annoyed at waiting but continues to wait for an available agent, and the time when a customer may abandon the call. FIG. 21 shows a graph where the time in which the customer may be annoyed at waiting but continues to wait for an available agent may add a slope to the Call Wait Function. In this example, call center management has determined the match score to be 70 or greater, and also that the customer won't mind waiting for an agent for 40 seconds. After 40 seconds, the customer starts to get annoyed having waited so long. At this point, the longer the customer has to wait, the more annoyed they will become. For this reason, after 40 seconds, call center management allows agents with lower match scores to handle the call. In this example, at 50 seconds an available agent with a match score of 65 or greater may handle the call. At 60 seconds, an available agent with a match score of 60 or greater may handle the call. This exemplary call center has determined that after 70 seconds of waiting, the customer may abandon the call. Thus, at 70 seconds, before call abandonment may occur, any available agent may handle the call.

Figure 22:
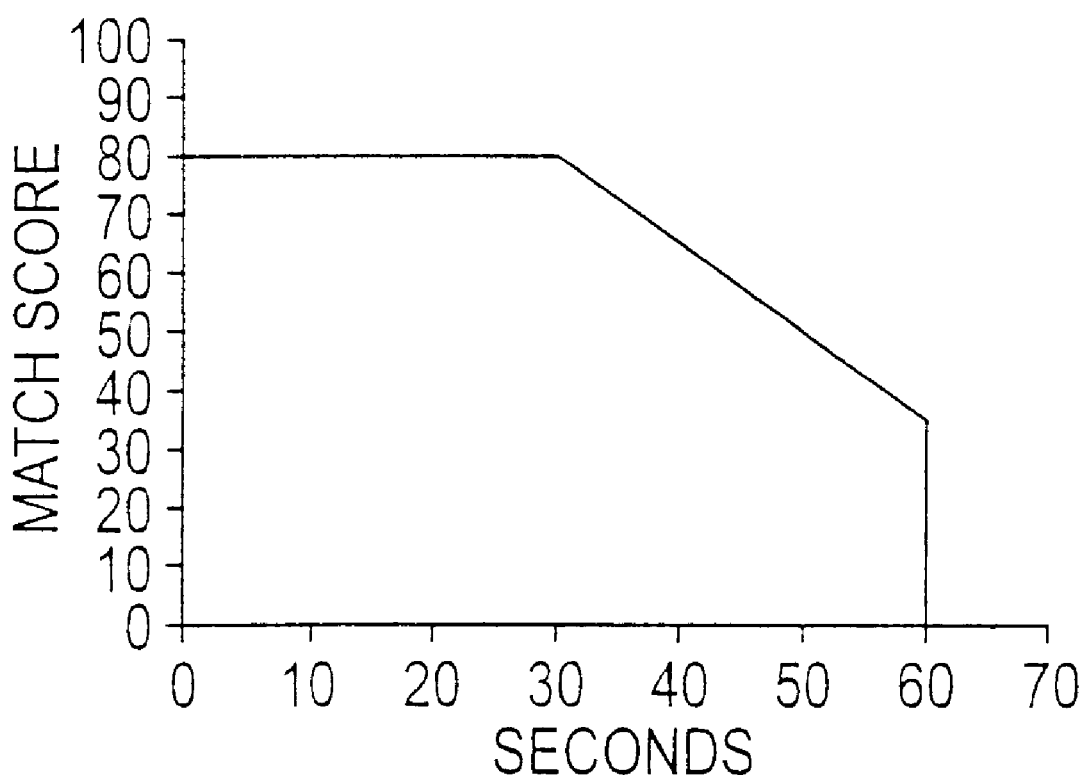
FIG. 22 is a graph of an exemplary call wait function with an acceptable match score of 80 and a maximum 30 second wait, then a decreasing match score up to a 60 second wait according to the present invention.

FIG. 22 shows a graph where the acceptable match score is 80 or greater. The customer may be willing to wait for 30 seconds for an available agent before becoming annoyed. At 30 seconds, agents with lower match scores may handle the call. For example, at 40 seconds an available agent with a match score of 65 or greater may handle the call, and at 50 seconds, an available agent with a match score of 50 or greater may handle the call. After 60 seconds a customer may abandon the call, therefore, at this time any available agent may handle the call.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular means, materials, and embodiments, the present invention is not intended to be limited to the particulars disclosed herein, rather, the present invention extends to all functionally equivalent structures, methods and uses, such as are within the scope of the appended claims.

What is claimed is:

1. A method for intelligent routing of requests from a customer to an agent in a telecommunications environment comprising:

receiving a request from a customer;

creating a model of the customer, the model of the customer being calculated from a detailed profile of the customer's needs, task objectives, sales preference, and expectations for satisfaction;

creating a model of at least two agents;

comparing the model of the customer with each of the models of the at least two agents;

routing the request from the customer to a best matched agent of the at least two agents based on the comparing;

obtaining identifying information from the customer;

retrieving historical background information regarding the customer based on the identifying information;

searching for historical background information regarding the customer's account based on the identifying information; and obtaining information regarding the customer's current task objective and the customer's current expectations for satisfaction, the customer's current task objective and the customer's current expectations for satisfaction each comprising one or more attributes, the customer's expectations for satisfaction attributes comprising at least one of the customer's willingness to be up-sold additional products or services, the customer's preference for a lengthy or brief negotiation, and the customer's desire to have questions answered.

2. The method according to claim 1, the comparing comprising performance optimization calculations.

3. The method according to claim 2, the performance optimizing calculations being used to generate a match score for each of the at least two agents.

4. The method according to claim 3, the best match agent being one of the at least two agents with the highest match score.

5. The method according to claim 3, a list of optimal agents being generated based on the match scores of the at least two agents that are above an optimal threshold.

6. The method according to claim 5, the request from the customer being routed to an available agent on the list of optimal agents.

7. The method according to claim 5, the request from the customer being placed in a wait queue until an agent on the list of optimal agents becomes available.

8. The method according to claim 7, further comprising:
   reducing the optimal threshold the longer the request from the customer remains in the wait queue.

9. The method according to claim 8, the request from the customer being routed to an available agent with the highest match score when the wait time equals a maximum wait time.

10. The method according to claim 9, the optimal threshold and the maximum wait time being set by a call center controller.

11. The method according to claim 1, the identifying information comprising at least one of the customer's telephone number, e-mail, and account number.

12. The method according to claim 1, the identifying information being obtained by one of a human operator, an automatic caller ID system, an interactive voice response (IVR) interface, e-mail, Internet, and other communications channel.

13. The method according to claim 1, the customer's account information comprising at least one of the customer's billing history, products and services currently being provided, and household information.

14. The method according to claim 1, comprising upgrading the historical background information based on the customer's current task objective and the customer's current expectations for satisfaction.

15. The method according to claim 1, the task objective attributes and the expectations for satisfaction attributes being quantified and transformed into numerical values.

16. The method according to claim 15, comprising calculating and constructing the customer model using the task objective attributes values and the customer expectations for satisfaction attributes values.

17. The method according to claim 16, each task objective attribute and each customer expectations for satisfaction attribute assigned a weighting value based on a relative importance of the each attribute.

18. The method according to claim 17, the weighting value for each attribute being used in the calculating and constructing of the customer model.

* * * * *